UNITED STATES PATENT OFFICE.

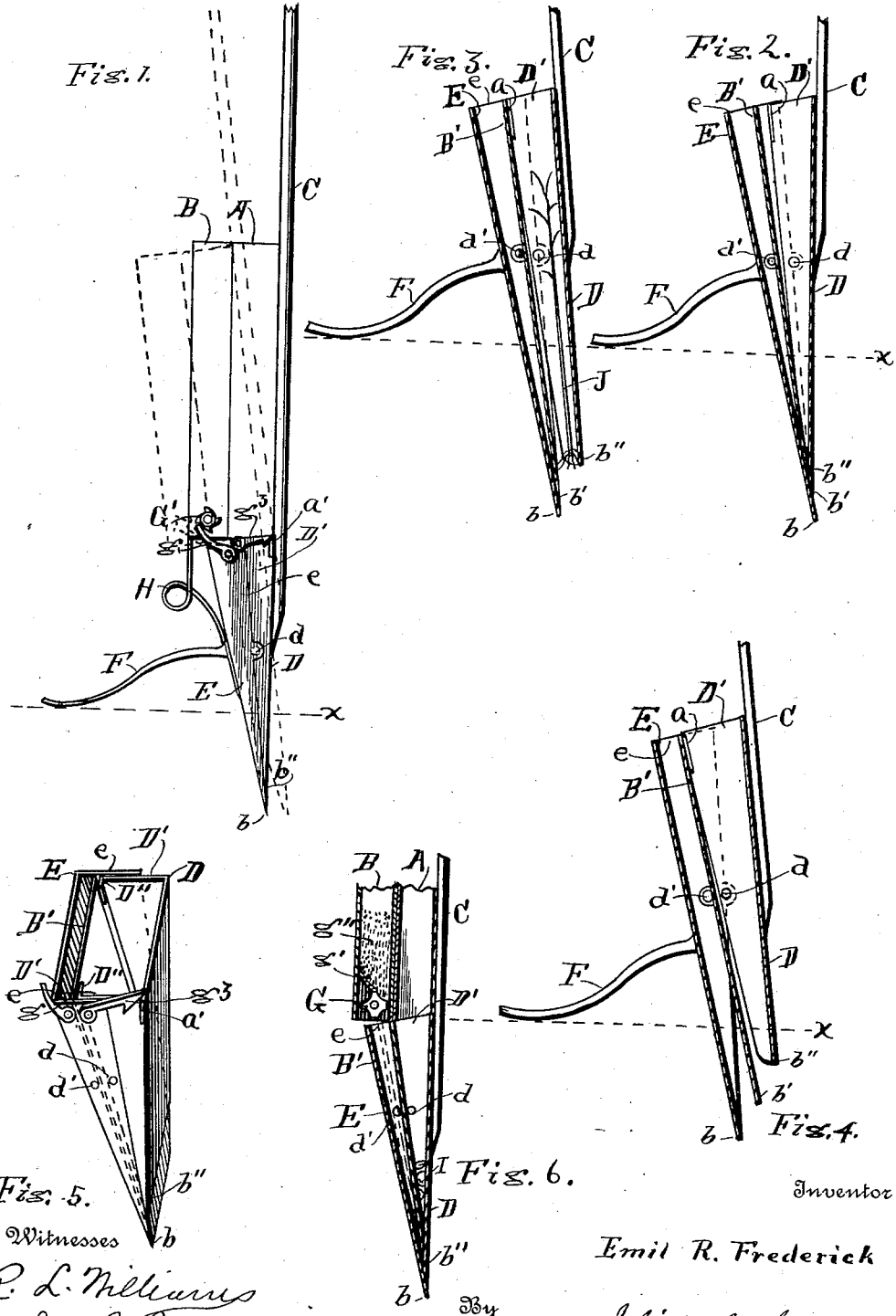

EMIL R. FREDERICK, OF SHELBY, MICHIGAN.

POTATO-PLANTER.

1,041,613.  Specification of Letters Patent.  Patented Oct. 15, 1912.

Application filed March 11, 1912. Serial No. 683,153.

*To all whom it may concern:*

Be it known that I, EMIL R. FREDERICK, a citizen of the United States, residing at Shelby, in the county of Oceana and State of Michigan, have invented certain new and useful Improvements in Potato-Planters, of which the following is a specification.

My invention relates to improvements in potato planters, and its object is to provide a means in a potato planter whereby a fertilizer may be carried in one compartment of the planter, and automatically placed in the hill after the potato has been planted. I attain this object by the mechanism illustrated in the accompanying drawing, in which—

Figure 1 is an edge elevation of the planter complete. Fig. 2 is a vertical section of the lower portion of the same closed. Fig. 3 is a like view showing the planter partly opened so that the seed potatoes may be dropped out of the planter into the hill. Fig. 4 is a like view showing the planter fully open so that both the seed potato and the fertilizer may be dropped from the planter into the hill. Fig. 5 is a perspective of the lower part of the planter showing the relative positions of the several elements that are combined to make a complete working device for the purpose set forth. Fig. 6 is a vertical section of the lower part of the planter, and of a part of the upper part or storage chambers showing the appliance for holding the fertilizer in its compartment and discharging it into the lower part of the planter and to the hill being planted.

Similar letters refer to similar parts throughout the several views.

In the accompanying drawing A represents the chamber or barrel through which the seed potatoes are passed into the lower compartment or dropper D, in the usual manner of dropping seed potatoes into this class of planters. With the handle C and the pivotal gate E properly combined with the elements B and D we have all of the elements contained in an ordinary potato planter.

My invention consists in so arranging these elements, with other elements to be hereinafter described, that the seed potatoes may be dropped into the hill and partly covered with dirt, and with the same movement a quantity of fertilizer may be dropped into the hill but not in direct contact with the potatoes, before the potatoes are wholly covered with soil. For this purpose I divide the lower part of the planter by pivoting a gate B' between the gate E and the wall D, as at $d'$. The gate E is formed with two right angled wings $e\ e$ that project back over the wings D' of the stationary part D of the planter, and is pivotally connected with, or to the said wings D' as at $d$, so that the introduction of the gate B' forms a compartment between the gate B' and the part D, for the passage of the seed potatoes, and a second compartment between the gate B' and the gate E for the passage of the fertilizer $g''$.

The gate E $e$ is held to normal position by means of any available form of spring, as indicated at H in Fig. 1, when the lower ends of the gates E and B' form a sharp wedge at $b$, with the lower end, $b''$, of the wall D, which may be readily forced into the ground until the lever F will rest upon the surface of the ground, indicated by the dotted lines $x$, in the several figures, when the handle C is forced forward, as indicated in Figs. 1, 3 and 4. When partly opened, as in Fig. 3, the lower end of the wall D is forced away from the gate B', at the lower end, and an opening is formed between the points $b'$ and $b''$ through which the seed potatoes may fall into the ground, but the points $b$ and $b'$, of the gates B' and E, will remain together until the handle has been carried forward far enough to bring the inwardly projecting wings $a$ in contact with the upper end of the gate B' and force said gate over with it until the points $b$ and $b'$ will be forced apart far enough so that any fertilizer that may be stored in the space between the gates B' and E will flow freely down into the pit formed in the ground by the planter for forming the potato hill before the planter is withdrawn from the ground. The lapse of time between the opening of the space between the end $b''$ of the wall D and the end $b'$ of the gate B' is sufficient to allow a quantity of sand or dirt to fall between the points $b'$ and $b''$, on top of the seed, so that the fertilizer will not come in direct contact with the seed, thus averting the danger of rotting the seed by contact with the fertilizer.

The gate E is pivotally connected with the part D of the planter by passing rivets, as $d$, through the pairs of wings marked D'—$e$, as indicated in Figs. 1 to 6, inclusive. It will be readily understood that the gate B' may be pivoted into the planter at $d$, where it will be centered exactly with the pivotal bearings of the gate E, but I prefer that it be pivoted to one side of this point as indicated at $d'$, and it is necessary that the upper end of the gate B' should be located a short distance away from the lugs or wings $a$ $a$ to allow of considerable movement to the part D so that the space between $b'$ and $b''$ will be well opened before the lower end of the gate B' is moved from contact with the gate E at $b$ $b'$, see Fig. 3.

It is obvious that a storage chamber or tube must be provided above the compartment between the gates B' and E for carrying the fertilizer, as indicated at B in Figs. 1 and 6, and to hold the fertilizer from flowing freely down out of said compartment B, and at the same time to feed it in proper quantities into the compartment between the gates B' and E, I place a corrugated feeder G in the bottom of the compartment B, with an inclined partition $g'$ to one side to properly conduct the fertilizer to the feeder, and arrange to actuate the feeder by means of a pawl $g$ pivotally secured to the side $e$ of the gate E in position to act upon the ratchet G' when the handle C is thrown forward, as indicated by its dotted lines in Fig. 1, so that every time the handle is moved back to normal position the feeder will be moved one fourth around and the fertilizer that may have been stored into one of the pockets or corrugations in the feeder will be dropped into the compartment between the gates last above mentioned.

This implement is designed as much for setting out plants, as for planting potatoes, and when used for this purpose the plant J is placed in the dropper, as indicated in Fig. 3, and when the planter has been opened at the low-end, as shown in Fig. 3 and indicated in Fig. 1, the latch $g^3$ will engage the catch $a'$ and hold the planter open so that the plant may not be drawn up when the planter is raised out of the ground after having formed the pit for the reception of the roots of the plant.

I, in Fig. 6 represents potato seed that have been dropped into the planter ready for planting, and it will be readily seen that when the handle C has been thrown forward, as indicated in Figs. 1 and 3, these seed must drop out of the planter into the pit as soon as the planter is raised out of the pit, and as the point of the edge $b''$ is considerably above the point or edge $b$ or $b'$, a quantity of dirt may drop into the pit above the seed, before the fertilizer is discharged into the hill, as herebefore stated, and the movement of the point $b'$ will tend to distribute the dirt over the seed so that the fertilizer cannot come in direct contact with the seed when it is first dropped into the pit formed by the planter.

What I claim as new, and desire to secure by Letters Patent of the United States, is:

1. In combination with the back wall, pivotal gate, handle and conductor chamber of a hand potato planter, a fertilizer chamber above the pivotal gate, and an auxiliary gate between the pivotal gate and the back wall to form a passageway for fertilizer to the potato hill.

2. In combination with the back wall, pivotal gate, handle and conductor chamber of a hand potato planter, a fertilizer chamber formed adjacent to the conductor chamber, a corrugated feed roll in said fertilizer chamber, an auxiliary gate pivoted between the pivotal gate and the back wall of the digger, and means for actuating said gates by carrying the top of the handle forward and backward.

3. In combination with the back wall, pivotal gate, handle and conductor chamber of a hand potato planter, a tube secured parallel with the conductor chamber forming a storage chamber for a fertilizer, a feed roller mounted in the lower end of said chamber, means for actuating said roller by forcing the handle backward and forward, an auxiliary gate in the compartment between the back wall and the pivotal gate to divide said compartment into two wedge shaped compartments, and means for holding the pivotal gate in normal position.

Signed at Shelby, Michigan, March 5, 1912.

EMIL R. FREDERICK.

In presence of—
 ALBERT V. HINDS,
 M. W. McQUARRIE.

---

Copies of this patent may be obtained for five cents each, by addressing the "Commissioner of Patents, Washington, D. C."